Patented Aug. 24, 1937

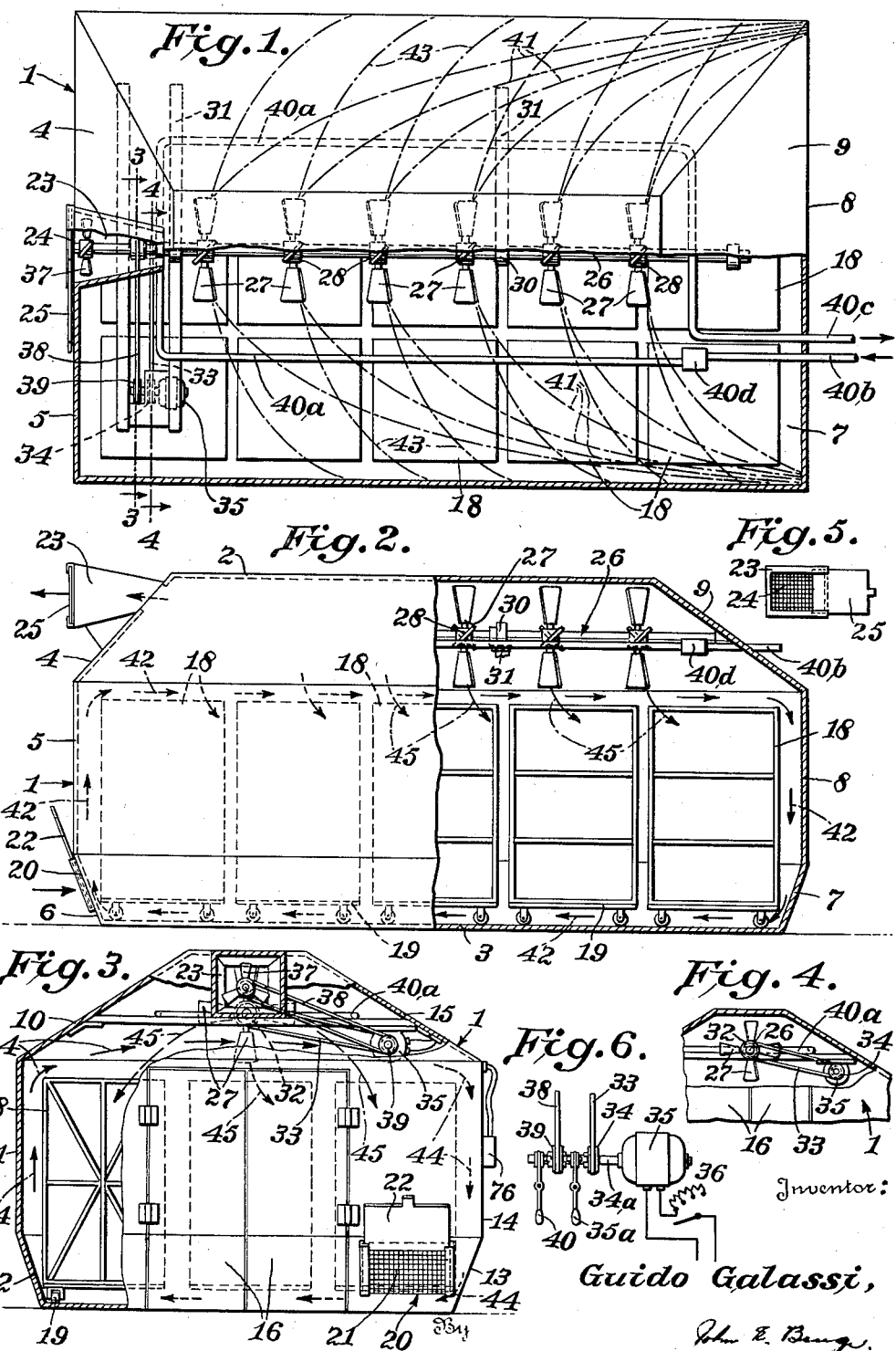

2,091,200

UNITED STATES PATENT OFFICE 2,091,200

DRIER

Guido Galassi, Chicago, Ill.

Application August 21, 1934, Serial No. 740,821

5 Claims. (Cl. 34—46)

My invention relates to apparatus for drying material particularly for the drying of alimentary products such as macaroni, spaghetti, etc., and it consists of the combinations, constructions and arrangements herein shown and described.

The purpose of the invention is to provide a construction adapted to apply uniformly over the surface of material to be dried a flow of air of equal quality throughout its mass as regards humidity and consequent drying power whereby the material will be dried at the same rate throughout resulting in a product of uniform or standard quality as to its state of dehydration, a desirable and necessary feature to be obtained in the case of products on which the use of the apparatus is contemplated.

Another object of the invention is the provision of a device of the type described that will be capable of regulation as to the degree of humidity of the air utilized in the drying operation, thus enabling control of the speed of drying.

The apparatus further has means for supporting the material in a manner allowing of easy placement of the same in position for the drying operation and removal from such position after dehydration.

A still further purpose is the provision of a device of the type described that has few parts, is simple to manufacture and does not get out of order easily.

Other objects and advantages will appear as the specification proceeds and the device will be more particularly described in the appended claims.

A structure by which I carry out the above aims is illustrated in the accompanying drawing forming a part of this specification in which Figure 1 is a top plan view with parts thereof broken away to show portions of the device in section and plan for clearness of illustration, Figure 2 is a side elevation of the device with a portion of the outer casing broken away for clearness of illustration, Figure 3 is an end view with parts broken away for better showing of details, Figures 4 to 6 are detail views.

In carrying out my invention I make use of a container 1, the side walls of which and the end walls of which when taken with the top and bottom walls in each case bound an enclosed area of octagonal shape in cross section. Thus as can be seen in Figure 2, the top 2, end walls 4, 5, and 6, bottom 3, and end walls 7, 8, and 9 are laid in planes forming an enclosure of octagonal form in cross section, taken lengthwise of the container, while walls 10, 11, 12, 13, 14, and 15 taken with the top and bottom form in cross section an octagonal figure transversely of the container as seen in Figure 3. This form of construction of the container plays a very important part in the distribution of the flowing air therein to carry out uniform drying of the product as will be described in more detail as the specification proceeds.

The container is provided with doors 16 in the end thereof through which ingress is had for placing the work 17 on which the device operates. This can be placed on suitable racks 18, which may take any desired form and be carried by trucks 19 for ease of manipulation.

The container has an air inlet 20 having a grate 21 for sifting the air as it comes in and a shutter 22 for controlling the extent of opening.

An air outlet is shown at 23, which is similarly equipped with straining means 24 and shutter control 25.

For circulating air in the container to dry the work a system of impellers 26 is provided, the blades 27 of each fan 28 having an inclination to the plane of rotation of approximately 35 degrees for a purpose that will be later described. The fans are mounted on a single shaft 29, journaled in bearings 30 positioned on transverse beams 31, which may be secured to the walls of the container in any suitable manner. This shaft is equipped with a pulley 32 at one extremity thereof which is engaged with belt 33, driven by a pulley 34 loosely mounted on the shaft 34a of motor 35. A clutch 35a connects and disconnects pulley 34 and shaft 34a. The motor is controlled by rheostat switch 36 placed on the outside of the container. The switch and motor are in circuit with any suitable source of electrical supply, (not shown).

For impelling air through the ejector 23, which is desirable after the apparatus has been in operation for some time and the contained air has taken on a high humidity, a fan 37 is used. This member is mounted in the ejector by any suitable means. It is driven by flexible member 38, which in turn is driven by loosely mounted member 39, when the same is clutched to continuously moving shaft 34a driven by motor 35. Lever 40 is provided to bring about this clutching action.

A rectangular pipe 40a mounted on beams 31 in the upper part of the container forms a heating unit or radiator for raising the temperature of the contained air to increase its vapor absorption quality in accordance with the well known physical principle stating that this quality increases directly as the temperature of the air. This pipe is supplied with steam or hot water by means of pipe 40b, the heating fluid being returned to its source by pipe 40c. A rheostat 40d controlling a valve, (not shown) in pipe 40b determines the rate of flow of the heating medium and hence the temperature of the air inclosed.

In Figures 1, 2, and 3 I show diagrammatically the main streams or currents of air produced by the impellers in the container. As heretofore stated the blades of each impeller are inclined at an angle of approximately 35 degrees to the plane of rotation thereof. Setting the blades at this angle propels about two-thirds of the air forwardly along a path indicated by lines 41 in Figure 1. The stream of air propelled in this direction impinges on the slanting end wall 9 and follows the walls 8, 7, 3, 6, 5, 4, and 2 as shown by the arrows 42 of Figure 2, back to the point where it is recirculated. This path encompasses the work in one direction, thus assuring circulation about the entire work and the removal of any pockets of stagnant air that might develop in the area surrounding the work, in this direction.

About one-third of the air impelled by the impellers takes on the path indicated by numeral 43. It will be noted that this path of air strikes the side walls at an angle sufficient to cause the air to descend in the container rather than slide along the wall towards the end of the container as is the case with air stream 41. The air in this stream, (43), will take on circulation in a lateral direction within the container as indicated by arrows 44 in Figure 3, due to the path circumscribed by the octagonal walls 2, 15, 14, 13, 3, 12, 11, and 10. This will keep the air in circulation laterally preventing the formation of air pockets about the work in this direction.

The arrows 45 are used to indicate the manner in which the air streams caused by the impellers penetrate the work in a diagonal direction downwards to assure the bathing of all portions of the matter spread on the racks with moving air. These streams serve only to further diffuse the air about the work thus tending to bring about uniform distribution of the same over the exposed surface of the matter to be dried. In actual experiments with a device constructed in accordance with my invention it has been found that the material to be dried has been dehydrated uniformly throughout its entire mass, thus testifying to the efficiency of this construction.

The operation is obvious from the above description. When it is desired to dry some product such as macaroni, for instance, the operator simply hangs the same on racks 18, opens doors 16 and moves the trucks 19 into the container. He then closes the doors. He also closes the shutters 22 and 25, closes clutch 35a and sets the impellers into operation by actuating switch 36. He can regulate the speed of the impellers by means of the rheostat contained in switch 36. The impellers will then operate to carry out the drying function as before described.

When the impellers have been working for some time sending a moving body of air over the material, the humidity of the air in the container will have increased to such an extent and its drying qualities consequently decreased, that it will be desirable to renew the supply of air to carry on the drying process. The operator then simply opens shutter 25 and actuates fan 37 by means of clutch 49 to force air from the ejector 23. The ejection of this air of course lowers the humidity of the contained air. Shutter 22 can be opened during this operation or thereafter as desired to admit air of normal humidity or rather lower humidity than the air of the container, which will consequently increase the drying quality of the contained air. The screen 21 will exclude foreign matter from contact with the work, thus assuring cleanliness and sanitation in the resulting product.

The radiating unit will assure raising of the inclosed air to the proper temperature during the operation. When the operation is suspended, the operator need only stop the admission of the heating fluid by shutting off the steam or water as the case may be at its source by means, (not shown).

When the proper degree of dehydration has been reached the operator need simply shut off the motor, open the doors and wheel the trucks from the container.

It is thus seen that I have provided a device capable of evenly distributing a current of air of uniform humidity over the surface of material to be dried so that the resulting product is of equal quality throughout as regards its state of dehydration.

It is also seen that I have provided a device capable of drying material at any desired rate of speed throughout a range of considerable extent.

It will also be noted that the arrangement performs its functions in a simple and efficient manner and by the use of a small number of structural details.

I claim:

1. A drier comprising a casing for housing material to be dried, means for supporting the material within said casing and spaced from its walls, said casing having an air inlet and an air outlet at one end, rotary air-impelling means for circulating air axially and radially thereof toward the opposite end of said casing and substantially uniformly about and thru the interstices of the material, a heater supported within said casing substantially in the plane of the axis of said air-impelling means, and other air-impelling means mounted in the said outlet for ejecting a portion of the circulating air from the casing as required.

2. The drier as set forth in claim 1, wherein the said rotary air-impelling means is disposed within said casing in proximity to and at one side of the said air ejecting means and is adapted to circulate air along its axis in a direction opposite to that of the air ejected from said outlet.

3. The drier as set forth in claim 1, wherein the said air-impelling means is in the form of a plurality of interconnected bladed units uniformly spaced apart lengthwise of the said casing and the blades of each unit are angled in a manner to circulate the heated air radially outwardly from the air circulated axially of the units in proximity to said heater.

4. The drier as set forth in claim 1, wherein closures are provided for the said inlet and outlet so that, when closed, confined heated air within said casing is circulated by the air-impelling means.

5. The drier as set forth in claim 1, wherein the said air inlet and outlet of the casing are each provided with a screen-filter for the air passing therethrough and a closure means is provided to prevent the passage of air into and from the casing if and when required.

GUIDO GALASSI.